United States Patent [19]

Flider

[11] Patent Number: 4,526,033

[45] Date of Patent: Jul. 2, 1985

[54] FILL GAUGE FOR SAFETY AND WASTE DISPOSAL DRUMS

[75] Inventor: Frank S. Flider, Mattoon, Ill.

[73] Assignee: Justrite Manufacturing Company, Chicago, Ill.

[21] Appl. No.: 533,593

[22] Filed: Sep. 19, 1983

[51] Int. Cl.³ .............................................. G01F 23/06
[52] U.S. Cl. ...................................... 73/322; 73/307; 116/228
[58] Field of Search .................... 73/322, 319; 141/95

[56] References Cited

U.S. PATENT DOCUMENTS

| | | | |
|---|---|---|---|
| 2,475,080 | 7/1949 | Courcier | 73/322 |
| 3,359,799 | 12/1967 | Lubin | 73/322 |
| 3,397,577 | 8/1968 | Siebert | 73/322 X |
| 3,630,083 | 12/1971 | Gorans | 73/322 X |
| 3,691,839 | 9/1972 | Lasher | 73/322 |
| 3,988,857 | 11/1976 | Baumann | 141/95 X |
| 4,170,136 | 10/1979 | Martineau | 73/322 |

Primary Examiner—Daniel M. Yasich
Attorney, Agent, or Firm—Irwin C. Alter

[57] ABSTRACT

A fill gauge is provided which may be used in connection with a storage container to inform an operator of the relative status of a filling operation. A multiplicity of indicia are progressively displayed to provide an initial warning when the filling operation is nearly completed, and to signal when the filling should be terminated, such as when a desired air-gap has been established. Further indicia may also be provided relating to, for example, an overfilled condition. The fill gauge is reusable and inexpensive, and may be sealed for safe storage. Adjustments for use with fluids of differing density are possible.

9 Claims, 9 Drawing Figures

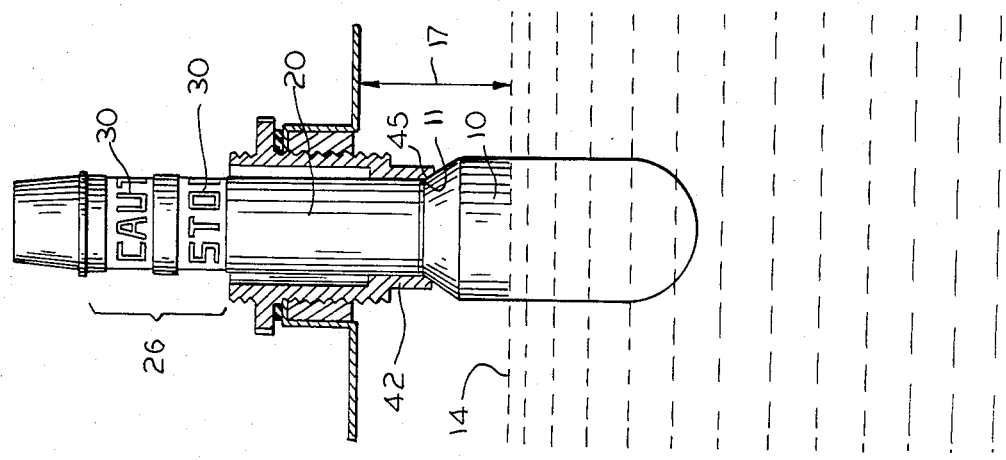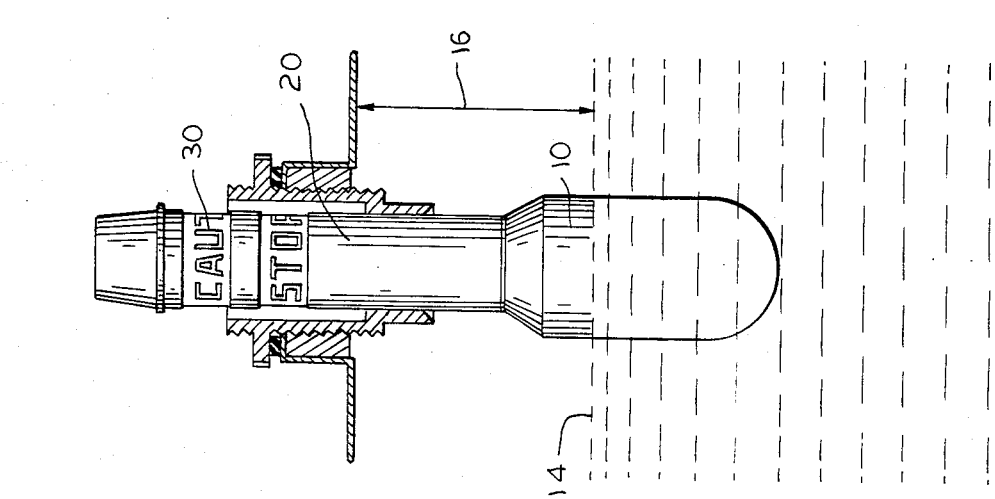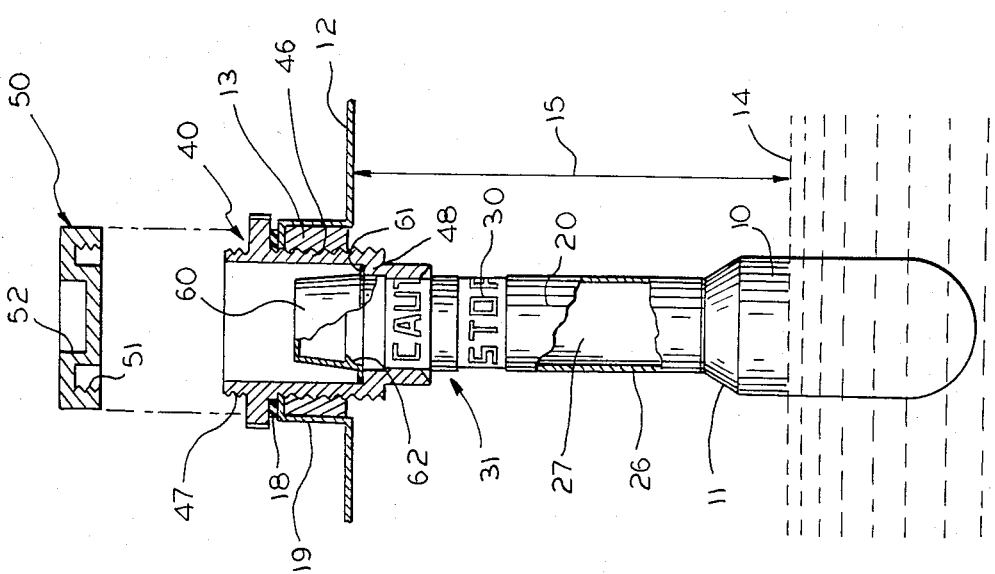

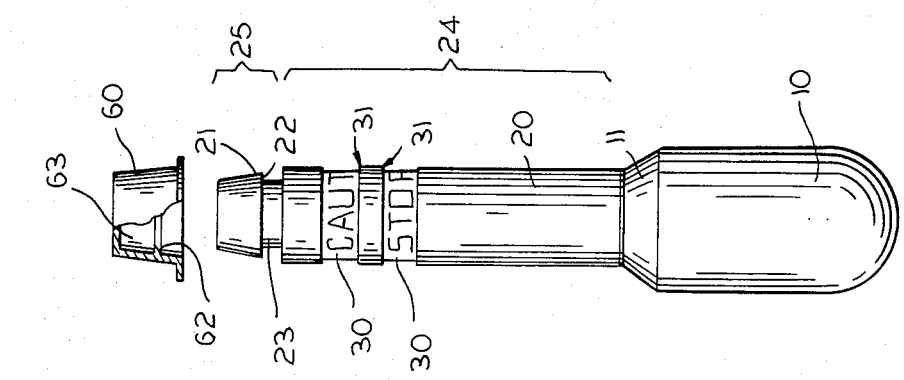
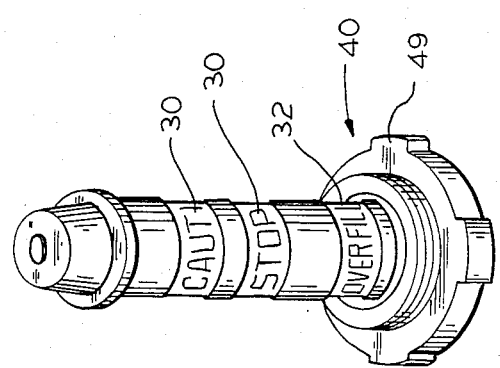
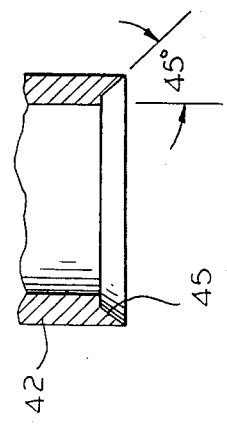
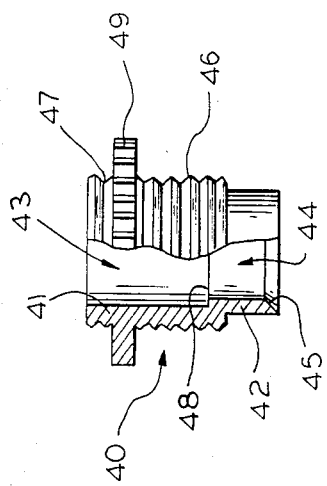
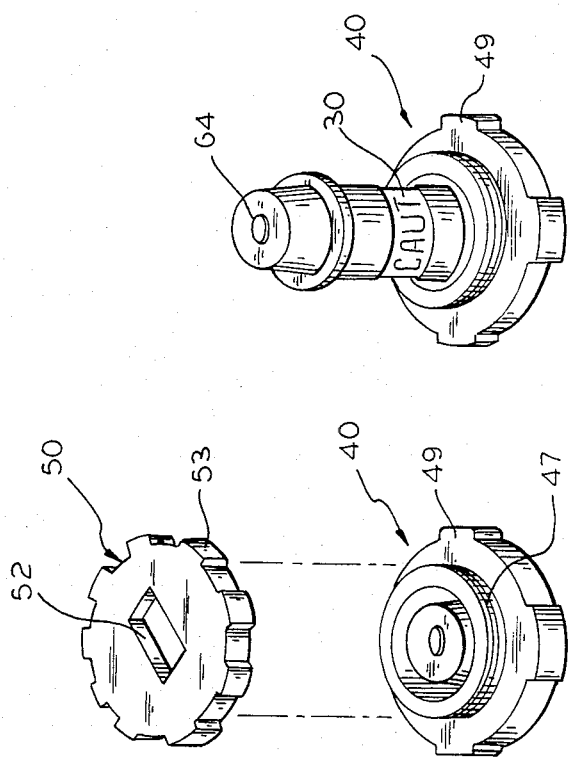
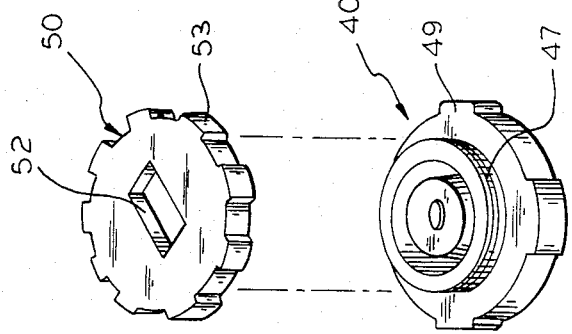

4,526,033

FILL GAUGE FOR SAFETY AND WASTE DISPOSAL DRUMS

BACKGROUND OF THE INVENTION

The present invention relates in general to fluid level gauges, and in particular to a fill gauge for safety and waste disposal drums providing progressive signals to an operator indicating when the associated container is nearly full, and when it is filled to a desired level, including a desirable air gap.

Industrial and technological advances in the United States have to a great extent been accompanied by, and have largely depended upon, corresponding advances in the chemical and petrochemical industries. Modern society, in fact, depends heavily upon the manufacture, distribution, and safe disposal of thousands of chemical and petrochemical products, including liquid chemical waste products generated by industry. Recently, concern has appropriately been focused upon actual and potential environmental pollution caused by such chemical and waste products, many of which may have serious adverse impact on the environment, and pose direct dangers to human health and well being.

A common method in use for disposing of or storing liquid chemical products and waste products involves placing the liquid within metal or plastic drums, such as the standard 55 gallon steel storage drum. Such storage drums are typically provided with one or more threaded openings in the top of the container, through which the chemical material may be filled and displaced air may escape. After filling, these openings are secured by threaded caps or other sealing means, and the drum is safe for transportation or storage. Similar procedures utilizing other forms of containers are also common.

In order to improve the safety in use of such procedures, it is desirable to leave a prescribed air space above the liquid, whereby the container is not completely filled. Such an air space permits thermal expansion of the contents of the drum without causing undue pressurization of the contents or leakage. Further, minor dents inflicted during handling and storage, which may reduce the effective volume of the normally cylindrical drums, will be more easily accommodated without displacing the enclosed chemical and causing an undesired spill.

Although numerous systems and methods are used in industry for filling such storage containers with liquid chemicals and wastes, they may be broadly grouped as mechanical pumping and as manual filling. In mechanical pumping, the liquid materials to be stored are generally transported into the container through a nozzle or hose under pressure provided by some form of a fluid pump. Because the liquid is supplied to the container under pressure by the pump, the container may be rapidly filled. In manual filling, in contrast, a large funnel is typically inserted into one of the openings in the top of the container, and the liquid chemical or waste is then poured into the container through the funnel. Such manual procedures are often used when low volumes of chemical waste are generated, or at remote sites where pumping apparatus may not be readily available.

There are many shortcomings associated with such typical procedures. For example, it is very difficult for an operator to determine the extent of filling of a common steel drum, for visibility is highly restricted or nonexistent. In order to determine the extent of the filling an operator is generally required to look into one of the available access openings. This may present a danger, however, when objectionable chemicals are being filled, for there is the potential for displaced chemical fumes or droplets of the chemical itself spewing out and contacting the operator. Such problems may be aggravated when pumps are used to supply the liquid, for the relatively high velocity stream of liquid dispensed by the nozzle may cause splashing or foaming, while the rapid filling rate makes it difficult to accurately determine the level of fluid filled. Although manual filling may proceed less rapidly, the necessary funnel blocks the entire opening and leaves little if any visibility for determining the level of filled fluid. As a consequence, not only is it difficult in both instances for the operator to know when to stop filling a container, but it is particularly difficult for a prescribed air gap to be reliably maintained in each storage drum filled.

Because of the lack of reliable information as the drum nears being filled, it is common for an operator to accidentally overfill a drum and cause a chemical spill and contamination of the filling site. This problem is aggravated by the fact that such procedures are in widespread use for disposal or storage of chemicals generated by small operators, or located at dispersed and remote sites. Although a single such spill may be relatively minor, a typical filling operation may involve tens or even hundreds of drums. As a result, highly undesirable and largely unnecessary chemical contamination is common at many chemical fill and disposal sites.

In order to minimize such site contamination, many operators place the drum to be filled within a second overflow drum to catch any accidental spills. This cumbersome procedure is not entirely satisfactory, however. For example, although the overflow drum may contain a spill, it does not prevent the spill itself or the unnecessary exposure of the operators to the chemical material, including chemicals spilled across the top and down the side of the drum. When highly objectional chemicals are being handled, it may therefore be necessary to additionally provide for special handling of the contaminated containers, or for decontamination of the drum exteriors. In addition, such procedures offer no remedy for the problems of maintaining a desired air gap.

In view of the foregoing, it becomes an object of the present invention to provide a system for reliably informing the operator of the status of a filling operation for chemical and other storage and transportation containers, as the container nears its filled state. A related object is to provide a system which first informs the operator that the container is nearly filled to a desired level, so that additional caution may be used or the filling operation slowed, and which then informs the operator when the desired filled state has in fact been accomplished. A further related object is to provide such a system whereby the filled indication results when a preselected and desirable air space remains unfilled.

More specifically, it is an object of the present invention to provide a fill gauge for use with typical storage drums and containers which will reliably indicate when the container is nearly full, and when the container is filled to a desired level which may include a desired air space. A further object is to provide such a fill gauge which does not require complex mechanical or electrical components. Yet another object is to provide such a fill gauge which does not require close interrogation by the user, whereby the user need not unnecessarily expose himself to undesirable and dangerous chemical contamination.

Another object is to provide such a fill gauge which may be adjusted to provide accurate indications when used with a variety of liquid chemical and petrochemical products having different densities.

A further object is to provide such a fill gauge usable with the two inch threaded bung openings typically provided in standard storage drums. Another object is to provide a removable gauge which may be attached or detached as desired for temporary use or for use with multiple containers.

Still another object is to provide such a fill gauge which may be left attached to the storage drum for storage. A further object is to provide such a gauge which may be securely sealed before and after use for safe storage.

Finally, an important object is to provide such a safety fill gauge which is simple and inexpensive, and adaptable for use with existing standard chemical storage containers, so that it may be widely utilized by all operators in order to prevent avoidable chemical contamination and spills.

These and other advantages, objects, and features of the present invention will become apparent in light of the present specification and accompanying drawings.

SUMMARY OF THE INVENTION

In order to achieve the aforementioned objects and to overcome the shortcomings and problems associated with the prior art, the present invention provides a fill gauge which indicates to an operator when a container such as a chemical storage or transportation drum is filled or nearly filled with a fluid.

A float is provided which will be lifted by the fluid when the level of the fluid in the container reaches the float. Attached to this float is a sliding piston, which will similarly be lifted by the buoyant forces applied to the float when the fluid level lifts the float as described. In one embodiment, the float and piston may comprise a single continuous unit.

The sliding piston and attached float are restrained in an upright position by a collar which surrounds the sliding piston. The collar is designed to provide a substantially close fit to the piston, yet permit the piston to slide, without excessive frictional forces, through the collar. Means are provided for restraining the sliding piston within the collar such that it may not pass completely through the collar in either an upward or downward direction.

The collar is also adapted to cooperate with the mounting means of the top of the container, so that the collar may be affixed in an opening in the top of the desired container so that the float is suspended within the container by the restrained sliding piston. In one embodiment the collar is provided with threading to cooperate with one of the typical two inch threaded bung openings provided in the top of standard storage drums. In order to facilitate attachment of the fill gauge to the drum, and to allow easy use of a single gauge with multiple drums, a grip means may further be provided in association with the collar to facilitate the threaded attachment and detachment of the gauge.

Indicia are then provided on the portion of the sliding piston which becomes progressively elevated above the upper surface of the collar when the float and sliding piston are moved to their uppermost position. The indicia may be selected to correspond to the level of the fluid relative to the top of the container. For example, as the drum is filled to near the top of the container, the fluid will contact and begin to lift the float, thereby also elevating the piston. The height of the piston is therefore related to the distance between the top of the container and the level of the fluid, with the piston height increasing as the fluid level rises toward a filled level. Indicia placed on the sliding piston are therefore progressively exposed to the operator, providing progressive information and warning related to the fluid level as desired.

In one embodiment, the indicia are provided by labels which are adhered to the sliding piston. Depressions may be provided in the piston corresponding to the labels such that the outer surface of the label will not interfere with the collar and restrict the sliding passage of the piston through the collar as desired.

BRIEF DESCRIPTION OF THE DRAWINGS

FIG. 1a is a partially cut-away view of the present invention with fluid level at a low level.

FIG. 1b is a partially cut-away view with the fluid level at an intermediate level.

FIG. 1c is a partially cut-away view with the fluid level at a filled level.

FIG. 2 is a top perspective view showing operation of the present invention with fluid level at a low level.

FIG. 2b is a perspective view showing operation with fluid level at an intermediate level.

FIG. 2c is a perspective view showing operation with fluid level at an overfilled level.

FIG. 3 is a side view of the float and piston of the present invention, with a partially cut-away view of the associated cap.

FIG. 4 is a partially cut-away side view of the collar of the present invention.

FIG. 5 is a detailed cross-sectional side view of the preferred embodiment of the flange of the collar illustrated in FIG. 4.

DETAILED DESCRIPTION OF THE PREFERRED EMBODIMENT

The remaining portion of this specification will describe preferred embodiments of the invention when read in conjunction with the attached drawings.

In a preferred embodiment illustrated in FIG. 3, an integral unit comprising a float 10 and a sliding piston 20 is provided. The float 10 is dimensioned to provide adequate displacement of fluid to support the weight of float 10, of sliding piston 20 with attached indicia 30, and of cap 60, as well as to overcome any friction present between the sliding piston and its associated mounting collar 40 illustrated in FIG. 4. The float 10 may be constructed of any light weight and preferably chemically inert material to provide such buoyancy, and in the preferred embodiment comprises a substantially hollow air-filled float of molded plastic.

Attached to the top of float 10 is sliding piston 20, which comprises a lower region 24 and an upper region 25. The lower region 24 is of substantially constant cross-section, and in the preferred embodiment is substantially cylindrical. Sliding piston 20 is further provided with a smooth outer surface which may slide with minimum friction through collar 40 in response to the buoyant forces applied by float 10 as discussed.

The sliding piston is further provided with one or more indicia 30 which provide visible notification to the operator of the status of the filling operation, as discussed in further detail in connection with FIG. 1. In a preferred embodiment, indicia 30 may be adhesive labels attached in manners known in the art. Recesses 31 are provided in sliding piston 20 to accept the indicia labels 30, with the depth of recesses 31 being equal to or preferably slightly greater than the thickness of the indicia label so that the resulting cross-section of the piston with the indicia attached does not exceed the normal cross-section of sliding piston 20. In this manner, the indicia will not interfere with sliding movement of the sliding piston 20 through the collar 40 during operation of the fill gauge.

Sliding piston 20 further includes an upper portion 25 which is adapted to receive a restraining means. In particular, in the preferred embodiment illustrated, the upper portion 25 has at all points a cross-section less than or equal to the cross-section of the lower portion 24 of sliding piston 20. Accordingly, the upper portion 25 may pass unencumbered through the collar 40 in advance of the lower portion 24. Once so inserted, a cap 60 may then be applied. Cap 60 includes a brim 61 with a diameter greater than that of sliding piston 60. This brim 61 therefore provides a restraining means which will prevent the sliding piston from passing back through and out of the collar 40, as described in further detail in connection with FIG. 1.

In the embodiment illustrated, cap 60 is a snap-on cap which may be easily attached to the upper portion 25 of the sliding piston 20. Specifically, the upper portion 25 of piston 20 is provided with a notch 23 with a reduced diameter or cross-section. Above notch 23, the upper portion 25 of piston 25 may preferably comprise a truncated cone terminating at the notch in a maximum diameter region 21, and a joining lip 22. Disposed within the interior cavity 63 of cap 60 is a raised ridge 62, whose diameter is slightly less than that of the maximum diameter region 21 of upper portion 25. Accordingly, when cap 60 is forceably applied over upper portion 25 of sliding piston 20, ridge 62, which comprises deformable material, preferably plastic, is deformed sufficiently to pass over the area of maximum diameter 21 and lodge within notch 23. Interaction of ridge 62 in its relaxed position in notch 23 and lip 22 then securely fastens cap 60 to the sliding piston 20. A substantially permanent connection may be accomplished by providing ridge 62 with a substantially flat upper surface to cooperate with lip 22 and prevent ridge 62 from passing back over lip 22. Alternatively, cap 60 may be made removable by providing ridge 62 with a rounded or sloping upper surface, in manners known in the art.

The sliding piston 20 is restrained in an operable position by collar 40, illustrated in FIG. 4. Specifically, a smooth aperture 44 is provided in the lower portion 42 of collar 40 for surrounding sliding piston 20. The diameter of aperture 44 is selected to be sufficiently greater than the diameter of sliding piston 20 to allow piston 20 to slide substantially freely through aperture 44 without undue friction, yet provide sufficiently conforming fit to mechanically stabilize sliding piston 20 in an upright position within collar 40.

Collar 40 is further provided with means for attaching the collar and associated sliding piston to the storage drum. In the preferred embodiment, mounting threads 46 are provided for cooperating with the typical 2-inch threaded bung opening in steel 55-gallon storage containers. It is understood that alternative mounting means similarly known in the art may also be used. In addition, collar grip means 49 are provided for facilitating attachment of the collar to the storage drum. Grip means 49 may be provided with means for facilitating use of tools known in the art for threaded attachment of the collar, or may provide for facilitated hand gripping, as in the embodiment illustrated in FIG. 2.

In addition to providing mechanical mounting of the sliding piston and float combination to the storage drum, collar 40 may provide protection for the device and means for sealing the opening for safe storage and transportation. In a preferred embodiment, the upper portion 41 of the collar is provided with an upper cavity 43 whose diameter is greater than aperture 44. The diameter of upper cavity 43 is chosen to be slightly greater than the diameter of brim 61 of cap 60, such that brim 61 and cap 60 may pass into and be substantially enclosed by upper cavity 43 when the sliding piston is in its downmost position, as illustrated in FIGS. 1a and 2a. A shelf 48 is provided at the intersection of the upper cavity 43 and the smooth aperture 44. Interaction of restraining brim 61 with shelf 48, as illustrated in cross-section in FIG. 1a, prevents the combination of cap 60 and sliding piston 20 from passing back through the collar in a downward direction, with brim 61 coming to rest on shelf 48 and thereafter supporting the weight of sliding piston 20 and attached float 10.

Finally, collar 40 may further be provided with means for attaching a sealing cap. In the preferred embodiment, cap mounting threads 47 are provided for cooperation with sealing cap threads 51 of a threaded sealing cap 50, as illustrated in cross-section in FIG. 1a. Sealing cap 50 may further include grip means 53 to facilitate attachment, as well as mechanical engagement means 52 to facilitate use of tools known in the art for secure attachment of the sealing cap, as shown in FIG. 2a.

Operation of the present invention may be best understood in connection with FIGS. 1 and 2. Specifically, as shown in FIG. 1, the collar 40 is attached to bung opening 19 located in the top surface 12 of a storage container. In the preferred embodiment shown, mounting threads 46 cooperate with the threaded bung insert 13 typically employed in connection with storage containers. Gasket washer 18 may optionally be provided to assure a fluid and vapor tight seal. When so mounted, the sliding piston 20 is preferably in a substantially vertical position, with float 10 supported within the interior cavity of the storage container.

As the container is filled, the fluid level 14 will rise progressively nearer to the top surface 12 of the container. Initially, the level 15 will not sufficiently contact float 10 to provide adequate fluid displacement to support the combined weight of float 10, sliding piston 20, indicia 30, and cap 60. The weight will, however, be supported by brim 61 of cap 60, interacting with shelf 48 of collar 40. As seen in FIG. 1a, in this condition, the indicia 30 lie below the plane of the top surface of the upper portion 41 of collar 40, and are therefore not visible to the operator. Also shown in FIG. 1a is the preferred hollow unitary construction of sliding piston 20 and float 10, defining an interior cavity 27.

When the fluid level has risen sufficiently to engage float 10 and provide adequate buoyancy, float 10 will begin to lift sliding piston 20 and cause it to project above the upper surface of collar 40, as illustrated in FIG. 1b. As the distance between the fluid level 14 and the top surface 12 of the container progressively diminishes, that portion of the sliding piston which is visible above the collar means will progressively increase. Accordingly, a first indicia 30 located near the top of sliding piston 20 will initially become visible to the operator above collar 40 when the fluid level 14 has reached an intermediate level 16 which, in the preferred embodiment, corresponds to a nearly but not yet completely filled condition. A CAUTION warning may therefore be advantageously provided to the operator, so that the filling rate may be adjusted or additional caution utilized to assure that the container is not accidentally overfilled. As seen in FIG. 1b, however, additional progressive indicia are surrounded by the upper portion 41 of collar 40, and are therefore not as yet visible to the operator.

FIG. 1c illustrates the present invention in its fully elevated state. Specifically, fluid level 14 has approached within a minimum detectable distance 17 of the top surface 12 of the container, causing float 10 to engage the lower portion 42 of collar 40. A maximum visible portion 26 of the fully extended sliding piston 20 is then visible above collar 40. In one preferred embodiment, the maximum upward extension of sliding piston 20 may correspond to the desired fill level of the container, wherein the air-gap defined by distance 17 between the fluid level 14 and the upper surface 12 of the container is the desired storage air-gap. In this embodiment, a second indicia 30 informing the operator to STOP the filling operation may be provided to be just visible above the collar 40. In an alternative embodiment, whose operation is illustrated in FIG. 1c, the visible portion 26 of the maximally extended piston 20 may correspond to an overfilled condition where the remaining air-gap 17 is less than the desired gap. In this embodiment, an OVERFILL indicia 32 may be provided to further inform the operator that the desired air-gap has not been maintained. It is understood that a fewer or greater number of similar or differing indicia may likewise be provided.

As shown in FIG. 1c, when the float 10 is in its maximum upward position, ridge 11 is made to contact flange 45, shown in detailed cross-section in FIG. 5 of collar 40. In the preferred embodiment, the engagement of ridge 11 with flange 45 provides a substantial liquid seal between float 10 and collar 40. The seal is maintained by the buoyant force generated by float 10 when the liquid level 14 is at or above the level for maximum sliding piston extension, and is maintained by hydraulic pressure if the container is inadvertently tilted with the fill gauge extended and the sealing cap 50 removed. Although FIG. 5 details a preferred embodiment for the flange 45, it is understood that alternative embodiments, including those utilizing conforming gaskets or seals, may alternatively be used and would be known to one skilled in the art.

The maximum accuracy of the progressively visible indicia 30 in correlation to the fluid level 14 is dependent upon the specific gravity of the fluid displaced by float 10. For a fluid with a low specific gravity, a greater portion of float 10 will, of necessity, be immersed before sufficient buoyant forces are created to cause sliding piston 20 to rise with respect to collar 40. Alternatively, for denser fluids, such as viscous oils, the relative displacement of float 10 will be reduced. In order to provide for maximum flexibility, one embodiment of the present invention provides for adjusting the buoyancy of the float 10 and sliding piston 20 to compensate for dense fluids. Specifically, an aperture 64 may be provided in the top of sliding piston 20. This aperture 64 may serve to permit pressure equalization within the hollow cavity 27 of the sliding piston 20 and float 10. In addition, ballast weights, such as 63, may be inserted through aperture 64 to increase the total weight of sliding piston 20, float 10 and cap 60. In this manner, the accuracy of the information provided by the fill gauge is maintained without requiring recalibration of the indicia 30. A corresponding aperture may be provided in cap 60, or cap 60 may preferably have a solid top to prevent undesired entry of fluids or other contaminants. To provide maximum flexibility and adjustability, cap 60 may, as previously discussed, be removable and replaceable so that ballast weights may be added or deleted as desired.

It should be appreciated that embodiments of the fill gauge have been described to illustrate a preferred means whereby an inexpensive fill gauge for informing an operator of the status of a filling operation may be provided. However, it should be understood that the invention is not necessarily limited to use of the embodiments illustrated and discussed. For example, sliding piston 20 may present any desired cross-section, and may be of greater or lesser length with respect to collar 40 such that greater or fewer numbers of individual indicia may be utilized. Other forms of indicia may similarly be used, such as direct printing or embossing of the piston 20. Adjustable indicia may also be utilized to provide alternative means for compensating for the buoyancy of float 10 relative to fluids with differing specific gravities. Other forms of restraining means than brim 61 of cap 60 are also possible, such as slip rings cooperating with a slip ring notch or other methods known in the art for providing restraint.

It should therefore be understood that the invention may be embodied in other specific forms without departing from its spirit or essential characteristics. The present embodiments are, therefore, to be considered in all respects as illustrative and not restrictive, the scope of the invention being indicated by the claims rather than by the foregoing description. All changes which come within the meaning and range of the equivalents of the claims are, therefore, intended to be embraced therein.

I claim:

1. A fill gauge for use with fluid storage and transportation containers to indicate when a container is filled or nearly filled with fluid, wherein said fill gauge comprises:

a substantially vertical sliding piston mounted in an opening in the container;

a float, said float integrally extending from the bottom of said sliding piston;

collar means surrounding said sliding piston, said collar means defining an opening having a smooth inner surface conforming substantially to the outer surface of said sliding piston whereby said sliding piston may slide substantially unimpaired therethrough, said collar means further comprising means for removably attaching said collar means to the opening in the top of said container;

first restraining means at the bottom of said sliding piston to prevent said sliding piston from passing completely through said collar means in an upward direction;

second restraining means at the top of said sliding piston to prevent said sliding piston from passing completely through said collar means in a downward direction, the top of said sliding piston including a removable cap;

said second restraining means including a flange of a maximum circumference greater than the circumference of said sliding piston, and greater than the inner circumference of said collar means, the top portion of said sliding piston having a maximum circumference less than or equal to the inner circumference of said collar means, and one or more indicia, said indicia located on said sliding piston which may be passed through said collar means whereby said indicia become progressivly visible above said collar means as said sliding piston is lifted through said collar in response to buoyant forces acting upon said float as the upper level of said fluid in said container buoyantly contacts said float when said fluid becomes progressively proximate to said top of said container and flange.

2. The invention of claim 1 wherein said fill gauge further comprises the cap, said flange being integral to said cap and forming a brim thereon, said cap further comprising means for cooperating with said upper portion of said sliding piston for attaching said cap thereto.

3. The invention of claim 1 wherein said cap is a snap-on cap, said upper portion of said sliding piston having a maximum first circumference less than or equal to the circumference of said sliding piston;

said upper portion further including an annular notch of a second circumference, said notch proximate to the area of said maximum first circumference, wherein said second circumference is less than said maximum first circumference;

said snap-on cap comprising an inner cavity for passing over and surrounding said upper portion of said sliding piston, said snap-on cap further comprising radially disposed interference elements in said inner cavity, said interference elements defining an aperture whose relaxed circumference is less than said first maximum circumference of said upper portion, said interference elements located in said inner cavity of said cap such that said elements may deformably pass over the portion of said upper portion having said maximum first circumference to reside in said notch when said cap is passed over said upper portion, said interference elements substantially returning substantially to said relaxed circumference in said notch, thereby cooperating with said upper portion to secure said snap-on cap to said sliding piston.

4. The invention of claim 1 wherein said interference elements comprise a raised molded bead on the surface of said inner cavity of said snap-on cap.

5. The invention of claim 1 wherein said collar means further comprises:

a first lower cylindrical portion for cooperating with said sliding piston and having a smooth inner surface and an inner circumference slightly greater than the outer circumference of said sliding piston, whereby said sliding piston may slide substantially unimpaired therethrough;

a second upper cylindrical portion attached to said first cylindrical portion, the inner circumference of said second cylindrical portion being sufficiently greater than the outer circumference of said flange of said cap to permit said flange to slide therethrough, the point of attachment between said first and said second cylindrical portions defining a ledge, whereby said flange of said cap may pass downwardly through said second cylindrical portion of said collar and come to rest upon said ledge;

said second cylindrical portion extending upward from said ledge a distance at least equal to the height of said cap, such that said cap is enclosed within said second cylindrical portion when said flange is at rest on said ledge;

said fill gauge further comprising a sealing cap to securably cover and seal the aperture defined by the top portion of said second cylindrical portion, said second cylindrical portion further comprising means for cooperating with said sealing cap to removably attach said sealing cap to said second cylindrical portion.

6. The invention of claim 1 wherein said indicia comprise labels, and wherein said sliding piston further comprises depressions for receiving said labels wherein the depth of said depression is at least equal to the thickness of said labels.

7. The invention of claim 1 further comprising means for adjusting the buoyancy of the combination of said float and said sliding piston.

8. The invention of claim 1 wherein at least said sliding piston includes a hollow interior cavity, said buoyancy adjusting means comprising an aperture in said top portion of said sliding piston for insertion or removal of ballast weight with respect to said interior cavity.

9. The invention of claim 1 wherein said cap covers and substantially seals said aperture, said cap being removably attached to permit addition or removal of a ballast weight as desired.

* * * * *